Oct. 11, 1932.  L. POWELL  1,881,933
APPARATUS FOR DISTRIBUTING COMMINUTED MATERIAL
Filed Jan. 26, 1931
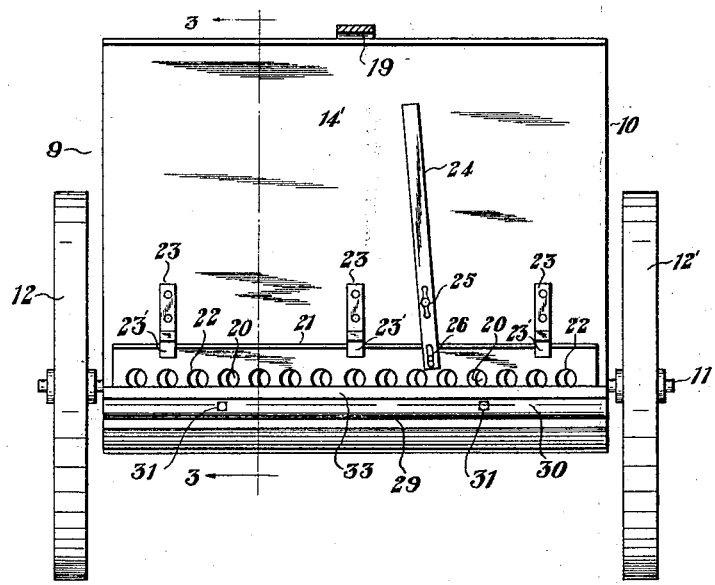
Fig. 1
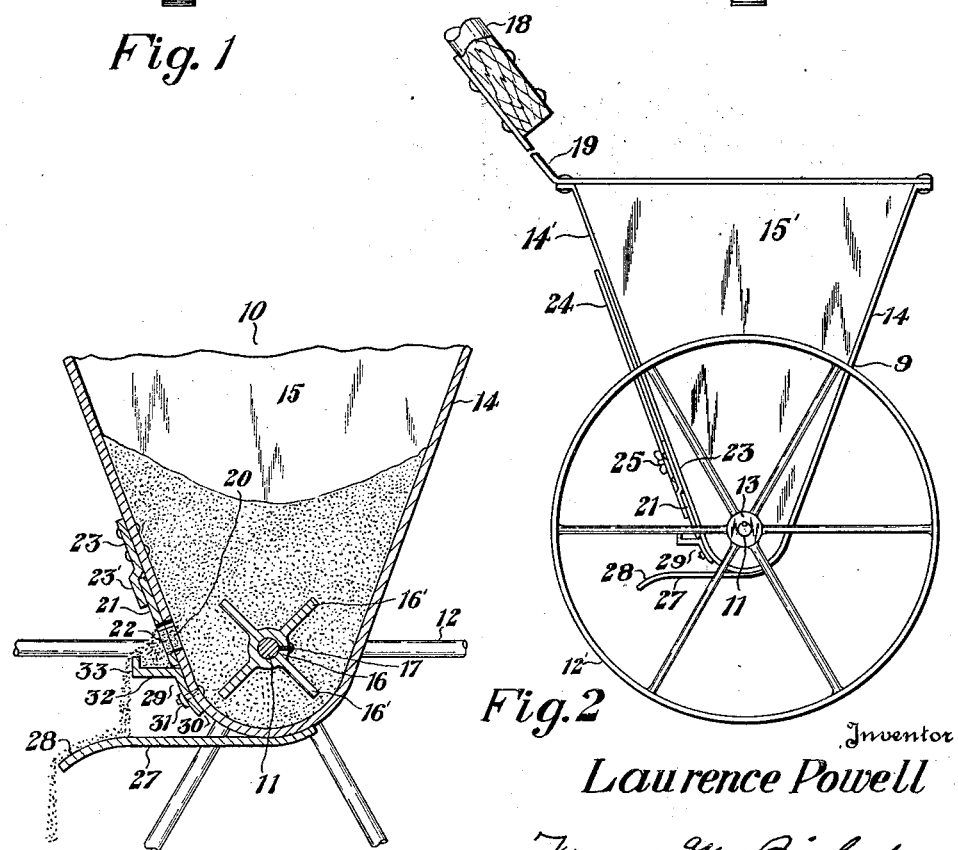
Fig. 3
Fig. 2
Inventor
Laurence Powell
By Frease and Bishop
Attorneys Patented Oct. 11, 1932

1,881,933

UNITED STATES PATENT OFFICE

LAURENCE POWELL, OF COLUMBUS, OHIO, ASSIGNOR TO THE SALEM TOOL COMPANY, OF SALEM, OHIO, A CORPORATION OF OHIO

APPARATUS FOR DISTRIBUTING COMMINUTED MATERIAL

Application filed January 26, 1931. Serial No. 511,274.

My invention relates to apparatus for uniformly distributing lime, fertilizer and the like over the ground, and more particularly to hand wheeled vehicles for uniformly distributing fertilizer over lawns or golf course greens, and the like.

Hand wheeled fertilizer distributors have been in use for many years, and generally include a hopper, means effecting a steady flow of fertilizer from the bottom of the hopper, and means uniformly distributing the flow of fertilizer from the hopper onto the ground.

Difficulty is had with the common type of distributor in using dry fertilizer material, in that when the distributing vehicle is stationary the fertilizer continues to flow out of the hopper and piles up at one location on the ground, precluding uniformity of distribution at that place.

A further difficulty arises in connection with such distributors when it is desired to uniformly distribute fertilizer and the like over a plot of ground within certain fixed boundaries. The usual method of accomplishing this result is to wheel the vehicle across the plot in successive parallel adjoining paths or zones, and it becomes necessary to turn the vehicle through 180° at the boundary termination of each path to position it for wheeling over the next adjoining path, or to move the vehicle diagonally in the reverse direction to bring it in position for the next adjoining path. During this turning or diagonal manipulation of the vehicle, fertilizer is constantly flowing onto the ground with the result that it is distributed outside the boundary lines where it is not desired, or is piled up at the boundary termination of each path.

An object of the present invention is to provide a distributing vehicle including means for mechanically discharging material from a hopper only when the vehicle is in forward motion, and means for preventing the distribution of fertilizer when the vehicle is stationary or being turned in one direction.

Another object is to provide simple and economically manufactured means for preventing distribution of the fertilizer when the vehicle is stationary or turning in one direction, which means may be easily incorporated in any standard type of distributor.

These and other objects are attained by the parts, improvements and combinations which comprise the present invention, and which are particularly and distinctly pointed out and set forth in the appended claims forming part hereof.

In general terms, the invention comprises an improved distributing vehicle including a storage bin or hopper journaled on wheels for movement over the ground, the hopper having a series of perforations at or near its bottom portion for discharging fertilizer and the like, means operatively connected to one of the wheels for agitating the fertilizer in the hopper and feeding it through the perforations, means for receiving the fertilizer from the perforations and distributing it uniformly over the ground and means acting to dam the flow of the fertilizer between the perforations and the distributing means when the vehicle is stationary or turning in one direction and permitting steady flow to the distributing means when the vehicle is in forward motion.

A preferred embodiment of the improvements is illustrated in the accompanying drawing, in which:

Figure 1 is a rear elevation view of the improved distributing vehicle;

Fig. 2 is a side elevation view thereof; and

Fig. 3 is an enlarged fragmentary sectional view as on line 3—3, of Fig. 1.

Similar numerals refer to similar parts throughout the drawing.

The distributing vehicle indicated generally at 9 preferably includes the storage bin or hopper 10 journaled at its lower portion upon the horizontally disposed axle shaft 11 between wheels 12 and 12'. These wheels are journaled on the ends of the shaft 11, and one of the wheels is preferably keyed to the shaft as shown at 13.

The hopper 10 may be open at the top and preferably includes an angular sheet metal member substantially V-shaped in cross section forming the front and rear walls 14 and 14' respectively. The end walls 15 and 15' may be of wood, and are secured to the walls 14 and 14′ in any well known manner.

The shaft 11 passes through the bottom portion of the hopper, being parallel to the planes of walls 14 and 14′ and journaled in the end walls 15 and 15′.

An agitator and feeder member 16, which may have four blades as represented at 16′, is secured to the shaft 11 within the hopper as by set screws 17, and extends substantially the full width of the hopper. Thus when the vehicle is moved over the ground the wheel 12′ will drive the feeder member 16.

A handle 18 is provided for moving the vehicle over the ground, and may be secured to an angular metal strap 19 which is in turn secured to the top of the hopper 10.

A horizontal series of perforations 20 is provided in the hopper wall adjacent the feeder 16 and extending substantially throughout the width of the hopper, and is preferably located in the lower portion of the rear wall as best shown in Fig. 3.

A feed regulating member 21, preferably in the form of a sheet metal plate, is disposed on the outside of the rear wall 14 over the perforations 20. The member 21 has formed therein a horizontal series of perforations 22 adapted to register with the perforations 20. Guide straps 23 may be secured to the rear wall 14 of the hopper for slidably holding the member 21 in position, and preferably include downwardly depending portions 23′ slidably engaging over the top portion of the plate 21.

Means for manually adjusting the feed regulating member 21 may include a hand lever 24 pivotally mounted on the rear wall 14′ of the hopper as at 25, and having a slot and pin connection with the member 21 as at 26. Thus manipulation of the lever 24 will bring the perforations 22 into and out of registration with the perforations 20.

A scattering or distributing member is provided for distributing onto the ground material discharged from the hopper through the perforations 20 and 22. This distributing member is preferably a sheet metal plate 27 secured as by welding or riveting to the bottom of the hopper, and extending substantially horizontally rearwardly therefrom a substantial distance beyond the perforations 22. The rear edge of the plate 27 may be curved downwardly as shown at 28 to aid in the distributing action.

The improved means for damming the flow of material from the perforations preferably extends laterally from the hopper below and adjacent to the perforations, and may be an angular member 29, preferably of sheet metal, and having the depending leg 30 secured to the wall 14′ below the regulating plate 21 as indicated at 31. A leg 32 extends horizontally rearwardly from the leg 30 immediately under the lower edge of the plate 21. A vertical upstanding flange 33 is preferably provided at the outer edge of the leg 32, and acts to dam the flow of material from the perforations when the feeder member is not being rotated.

In the operation of the improved distributing vehicle, forward movement thereof will rotate the wheels 12 and 12′, and rotation of the wheel 12′ will rotate the feeder 16, discharging the fertilizing material from within the hopper out through the perforations 20 and 22 and onto the dam member 29. When the feeder is rotating, the material will be forced over the flange 33 of the dam to fall onto the distributing plate 27, from which it will be distributed over the ground.

When the drive wheel 12′ and feeder are not rotating, as when the vehicle is at rest or is being turned to the right as viewed in Fig. 1, the material will be prevented from flowing from the perforations onto the distributing plate 27 by the damming flange 33, as shown in Fig. 3.

It will be seen that the present invention provides a simple and economical means for uniformly distributing fertilizer and the like over the ground and for preventing the flow thereof when the vehicle is stopped or turned in one direction; and that the improvement may be easily applied to any standard type of distributing vehicle.

Obviously, various modifications may be made in the construction and arrangement of parts of my invention without departing from the scope thereof, such as slight variations in the location of the perforations and the dam, and in the construction and design of the damming and distributing members.

I claim:

1. Apparatus for distributing comminuted material including walls forming a hopper, one of the walls having perforations formed therein for discharging material from the hopper, means rotatively mounted within the hopper for agitating the material and feeding the same out through the perforations, means for rotating the last said means, and a damming member on the hopper adjacent the perforations, the damming member including an upstanding flange for preventing discharge of material when the means for agitating and feeding material is stationary.

2. In a vehicle for distributing comminuted material, walls forming a hopper, one of the walls having perforations formed therein for discharging material from the hopper, wheels carrying the hopper, feeding means rotatably mounted within the hopper adjacent the perforations, means operatively connecting one of the wheels to the feeding means, and a damming member extending laterally from the hopper below and adjacent the perforations, the damming member including an upstanding flange for preventing discharge of the material when the last said wheel is stationary.

3. In a vehicle for distributing comminuted material, walls forming a hopper, one of the walls having perforations formed therein for discharging material from the hopper, wheels carrying the hopper, feeding means rotatably mounted within the hopper adjacent the perforations, means operatively connecting one of the wheels to the feeding means, and a damming member on the hopper adjacent the perforations, the damming member including an upstanding flange for preventing discharge of the material when the last said wheel is stationary.

4. In a vehicle for distributing comminuted material, walls forming a hopper, one of the walls having perforations formed therein for discharging material from the hopper, wheels carrying the hopper, feeding means rotatably mounted within the hopper adjacent the perforations, means operatively connecting one of the wheels to the feeding means, a distributing member on the hopper below the discharge perforations, and a damming member on the hopper adjacent the perforations, the damming member including an upstanding flange for preventing discharge of the material when the last said wheel is stationary.

5. In a vehicle for distributing comminuted material, walls forming a hopper, one of the walls having perforations formed therein for discharging material from the hopper, wheels carrying the hopper, feeding means rotatably mounted within the hopper adjacent the perforations, means operatively connecting one of the wheels to the feeding means, a feed regulating member movably mounted on the hopper for regulating the flow of material through the perforations, and a damming member on the hopper adjacent the perforations, the damming member including an upstanding flange for preventing discharge of the material when the vehicle is stationary.

6. In a vehicle for distributing comminuted material, walls forming a hopper, one of the walls having perforations formed therein for discharging material from the hopper, wheels carrying the hopper, feeding means rotatively mounted within the hopper adjacent the perforations, means operatively connecting one of the wheels to the feeding means, a feed regulating member movably mounted on the hopper for regulating the flow of material through the perforations, a distributing member mounted on the hopper below the discharge perforations, and an angular damming plate mounted on the hopper immediately below the perforations, the damming plate including a laterally extending portion and a flange extending upwardly therefrom for preventing discharge of the material when the vehicle is stationary.

In testimony that I claim the above, I have hereunto subscribed my name.

LAURENCE POWELL.